United States Patent
Coakley et al.

(10) Patent No.: US 6,789,558 B2
(45) Date of Patent: Sep. 14, 2004

(54) DIGITALLY CONTROLLED DIRECT DRIVE VALVE AND SYSTEM AND METHOD FOR MANUFACTURING THE SAME

(75) Inventors: Kim L. Coakley, Ventura, CA (US); Russell L. Bessinger, Palmdale, CA (US); Rex J. Blake, Lancaster, CA (US)

(73) Assignee: HR Textron, Inc., Valencia, CA (US)

( * ) Notice: Subject to any disclaimer, the term of this patent is extended or adjusted under 35 U.S.C. 154(b) by 1 day.

(21) Appl. No.: 10/236,258

(22) Filed: Sep. 4, 2002

(65) Prior Publication Data
US 2004/0040605 A1 Mar. 4, 2004

(51) Int. Cl.$^7$ ............................................. F15B 13/044
(52) U.S. Cl. ................ 137/10; 137/625.65; 251/129.05
(58) Field of Search .............................. 137/10, 625.65; 251/129.05

(56) References Cited

U.S. PATENT DOCUMENTS

| | | |
|---|---|---|
| 4,480,464 A | 11/1984 | Whisenand et al. |
| 4,513,782 A | 4/1985 | Contartese et al. |
| 4,674,323 A | 6/1987 | Rulf et al. |
| 4,790,233 A * | 12/1988 | Backe et al. ............ 137/625.65 |
| 4,970,941 A * | 11/1990 | Reinhardt ............... 137/625.65 |
| 5,012,722 A * | 5/1991 | McCormick ........... 137/625.65 |
| 5,285,715 A | 2/1994 | Elrod, Jr. et al. |
| 5,551,481 A | 9/1996 | Elrod, Jr. |
| 5,720,313 A | 2/1998 | Grobbel |
| 6,119,710 A | 9/2000 | Brown |
| 6,139,903 A | 10/2000 | Baron et al. |
| 2002/0114732 A1 * | 8/2002 | Vyers ........................... 466/62 |

FOREIGN PATENT DOCUMENTS

EP   0-834 723 A   8/1998

* cited by examiner

Primary Examiner—Gerald A. Michalsky
(74) Attorney, Agent, or Firm—Fulbright & Jaworski L.L.P.

(57) ABSTRACT

An electrical command signal to a direct drive valve is compensated by a digital signal processor to cause the output hydraulic fluid flow from the valve to conform to a desired predetermined flow. The compensation is accomplished by measuring flow from the valve using a standard direct drive valve code. This flow is compared to a desired flow and the difference is taken on a point to point basis. A compensation is then calculated to change the command signal so as to cause the flow to be according to the desired flow.

12 Claims, 6 Drawing Sheets

DIGITALLY CONTROLLED DIRECT DRIVE VALVE AND SYSTEM AND METHOD FOR MANUFACTURING THE SAME

FIELD OF THE INVENTION

This invention relates generally to valves for controlling the flow of hydraulic fluid from a source to a load and more specifically to a direct drive valve. More specifically the invention is directed to a direct drive valve which is controlled by motor control signals generated by a digital signal processor.

BACKGROUND OF THE INVENTION

Direct drive valves include a drive mechanism which moves a spool which in turn controls the flow of fluid from a source to a load. The drive mechanism is limited in its travel whether the drive motor is a limited angle rotary motor or a linear drive motor such as a solenoid or a voice coil. In such devices it is desirable that the output flow from the direct drive valve follows certain predetermined parameters. For example, it is often desired that the flow from the valve be linear in response to the command signals applied to the valve. It however may under certain circumstances be required that the flow follows other predetermined patterns. In order to accomplish the desired flow, the prior art generally shapes the ports through which the fluid flow passes to provide the desired output flow pattern. In some instances the output flow is controlled by attempting to linearize portions of the flow path and then amplifying the command signal to accomplish a more linearized flow. See for example the structure as disclosed in U.S. Pat. No. 5,285,715 which is assigned to the assignee of this application. An additional method for obtaining the desired output from a direct drive valve is shown in U.S. Pat. No. 5,551,481 which is also assigned to the Assignee of the present application. As is therein shown, the fully packaged drive motor is positioned upon a hydraulic stage and an appropriate control signal, which is indicative of a desired and predetermined output is applied to the drive motor. The output of the hydraulic stage is measured. The drive motor is then positioned with respect to the hydraulic stage by rotating and moving the drive motor, so as to obtain the desired output from the hydraulic stage. Prior art U.S. Pat. No. 4,513,782 discloses a traditional electrohydraulic servovalve as opposed to a direct drive valve in which a matching circuit is disposed between the input command signal and the servovalve control coil to assist in linearizing the output response of the electrohydraulic servovalve. This is accomplished by generating a look-up table which is stored in the memory and is used to modify the input command signal to cause the hydraulic magnitude output to be as desired at each available address. Such prior art processes and structures work adequately for the purpose intended. However these devices require a substantial amount of additional labor and may require substantial manual adjustment of each of the direct drive valves at the time of manufacture. As a result, the cost and time for manufacture is high.

It is therefore desirable to provide a direct drive valve which may be compensated through the utilization of a digital controller to provide the desired predetermined flow merely by manipulation of the control signal to the direct drive valve.

SUMMARY OF THE INVENTION

A direct drive valve includes a spool for controlling the flow of fluid from a source thereof to a load, a means for driving the spool and a digital signal processor for providing motor control signals to the means for driving the spool.

A system for providing compensation to command signals for a direct drive valve so that the fluid flow output therefrom conforms to a desired predetermined flow includes means for generating raw flow data from an uncompensated valve, means for calculating compensation variables analogous to a difference between the raw flow data and the desired predetermined flow from the valve, and means for applying the compensation variables to a digital signal processor for generating motor control signals for application to the direct drive valve to produce the desired predetermined flow therefrom.

A method for providing a predetermined fluid flow output from a direct drive valve includes generating raw flow data for the direct drive valve, comparing the raw flow data to a desired predetermined flow, calculating compensation variables analogous to the differences between the flow data and the predetermined flow, providing a digital signal processor to control the direct drive valve and loading the compensation variables into the digital signal processor.

DETAILED DESCRIPTION OF THE PREFERRED EMBODIMENT

Figure 1:
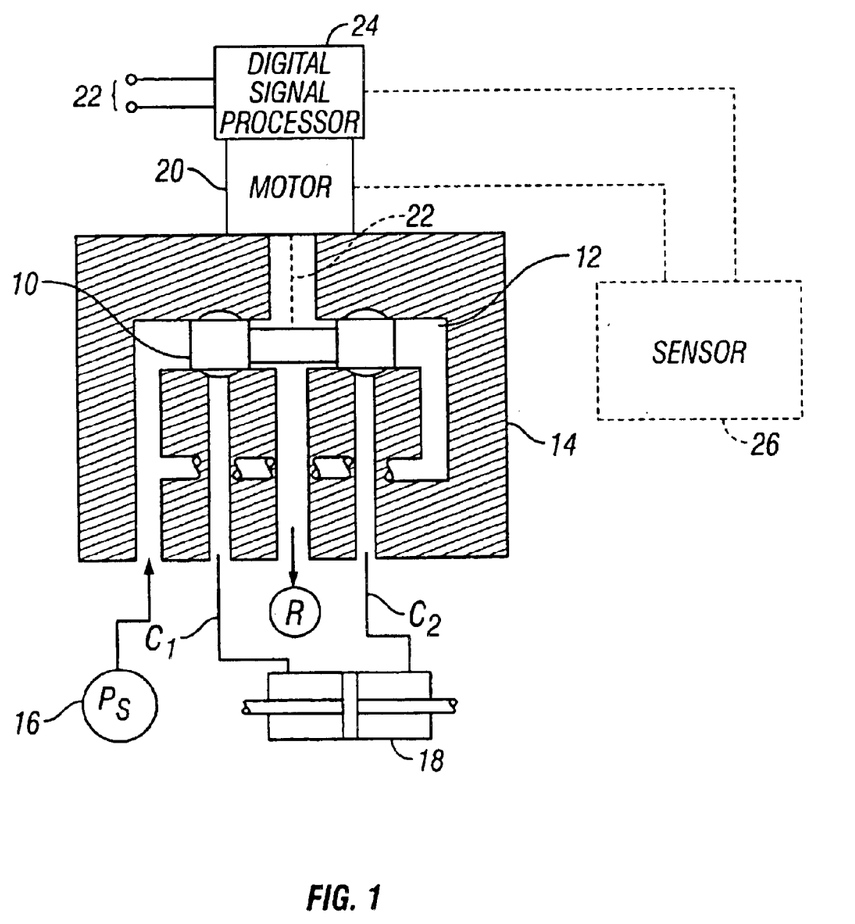
FIG. 1 is a schematic drawing of a direct drive valve constructed in accordance with the principles of the present invention.

Referring now to the drawings and more particularly to FIG. 1 there is shown in simplified schematic fashion a direct drive valve constructed in accordance with the principles of the present invention. As is therein shown, there is provided a spool 10 which is slidably disposed within a cylinder 12 formed within a body 14. The spool 10, as it reciprocates within the cylinder 12, controls the flow of fluid from a source 16 thereof to a load 18. To move the spool there is provided a drive motor 20 which is mechanically interconnected as shown at 22 to the spool 10 to cause it to reciprocate within the cylinder 12. The drive motor is controlled by command signals applied to the drive motor in accordance with input or command signals 22 which may come from any particular source depending upon the application involved. The input signals control a digital signal processor 24 which in turn generates the motor control signals applied to the drive motor 20. A position sensor 26 may provide feedback information such as spool position or motor position for use in generating the motor control signals.

In accordance with the principles of the present invention, the digital signal processor 24 provides digital signals in the form of pulse width modulated (PWM) signals to the drive motor 20 to cause it in turn to move the spool to predetermined positions in accordance with the command signal 22 so as to provide an output flow C1, C2 in accordance with a desired predetermined fluid flow parameter. For example, it may be desired that the fluid flow from the direct drive valve be linear in fashion or alternatively it may have any predetermined flow pattern that may be desired in accordance with a particular application, such for example, as an initial very low flow followed by a very high flow. The digital signal processor provides the ability for applying compensation variables to the command signals to, in turn, formulate the motor control signals supplied to the drive motor to accomplish any desired predetermined flow pattern from the direct drive valve that may be desired.

Figure 2:
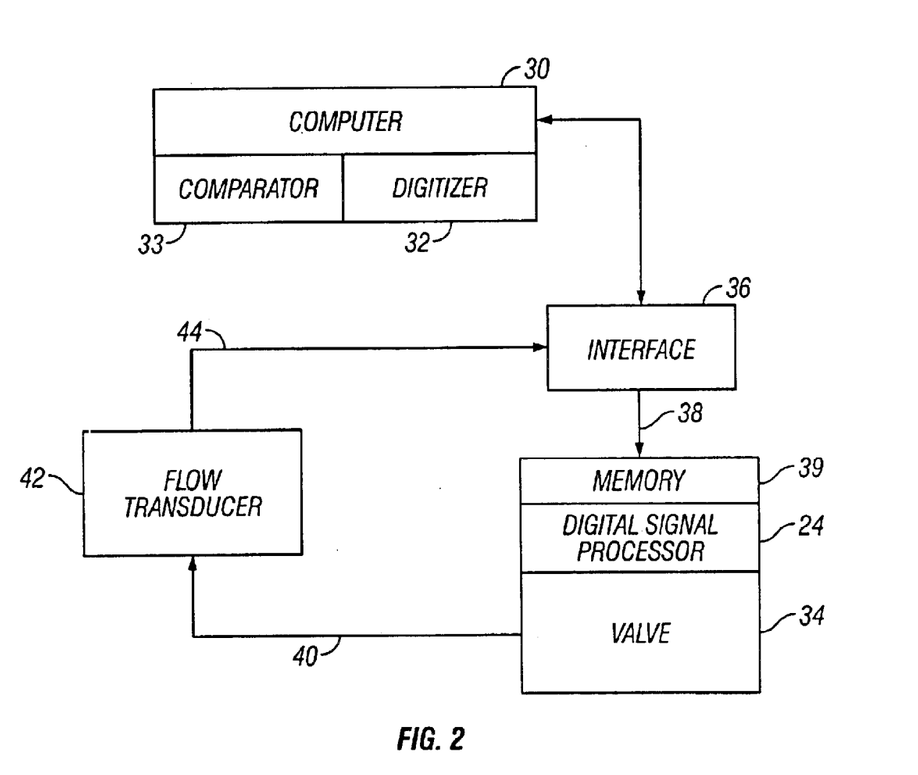
FIG. 2 is a simplified block diagram of a test stand used in conjunction with the method of the present invention.

To provide for such compensation variables the direct drive valve in its nonflow compensated form is attached a hydraulic test stand. Hydraulic test stands are well known and one such stand is shown in U.S. Pat. No. 4,480,464 which is assigned to the assignee of this application and which is incorporated by reference herein. One such hydraulic test stand is shown in simplified schematic block diagram form in FIG. 2 to which reference is hereby made. As is shown in FIG. 2 the hydraulic test stand includes a computer 30 which includes a digitizer 32 as a part thereof. The valve to be operated upon is shown at 34 and is attached to the test stand in such a manner that hydraulic fluid from the test stand can be passed through the valve in such a manner that the flow from the output ports thereof may be measured. An interface 36 is provided between the computer 30 and the valve 34. The interface is utilized to, among other things, generate and apply motor control signals over the connection 38 to the valve 34. As the motor control signals are applied through the spectrum of control signals normally associated with the valve 34 according to the standard uncompensated DDV algorythm or code the spool contained within the valve moves in accordance with the motor control signals thus generating a flow over the-conduit 40 which is in turn applied to a flow transducer 42. The flow transducer is well known to those skilled in the art and will produce an output analog signal which is representative of the flow from the valve 34. The output signal thus generated is analog and is applied by way of the lead 44 to the interface 36 where it is in turn applied to the digitizer 32. The digitizer is an analog to digital converter and may be any such A to D converter known to those skilled in the art.

The digital signal generated by the digitizer 32 is representative of the uncompensated output flow pattern from the valve 34 in response to the application of the motor control signals thereto. This output flow data is raw flow data. That is it is data obtained from valve 34 which has not been flow compensated. This flow data is compared internally of the computer in a comparator 33 with a desired predetermined flow pattern for the particular direct drive valve application under consideration. As a result of this comparison the differences between the actual raw data generated and the desired predetermined flow pattern is determined. The computer 30 then calculates compensation variables analogous to the differences between the raw flow data and the predetermined desired flow pattern on a point by point basis. These compensation variables are then loaded into the DDV code which is used to drive the valve 34. This DDV code would for example be stored in a memory 39 such as an $E^2$ PROM memory which is part of the valve 34. As a result, the flow of the valve 34 has been compensated to provide a desired predetermined flow from the valve 34 for the particular application for which it is intended. Upon initiation of operation (power up) for the valve 34 the compensated operating program from the memory is then downloaded into the digital signal processor which provides the motor control signals for the drive motor during operation of the direct drive valve.

Figure 3:
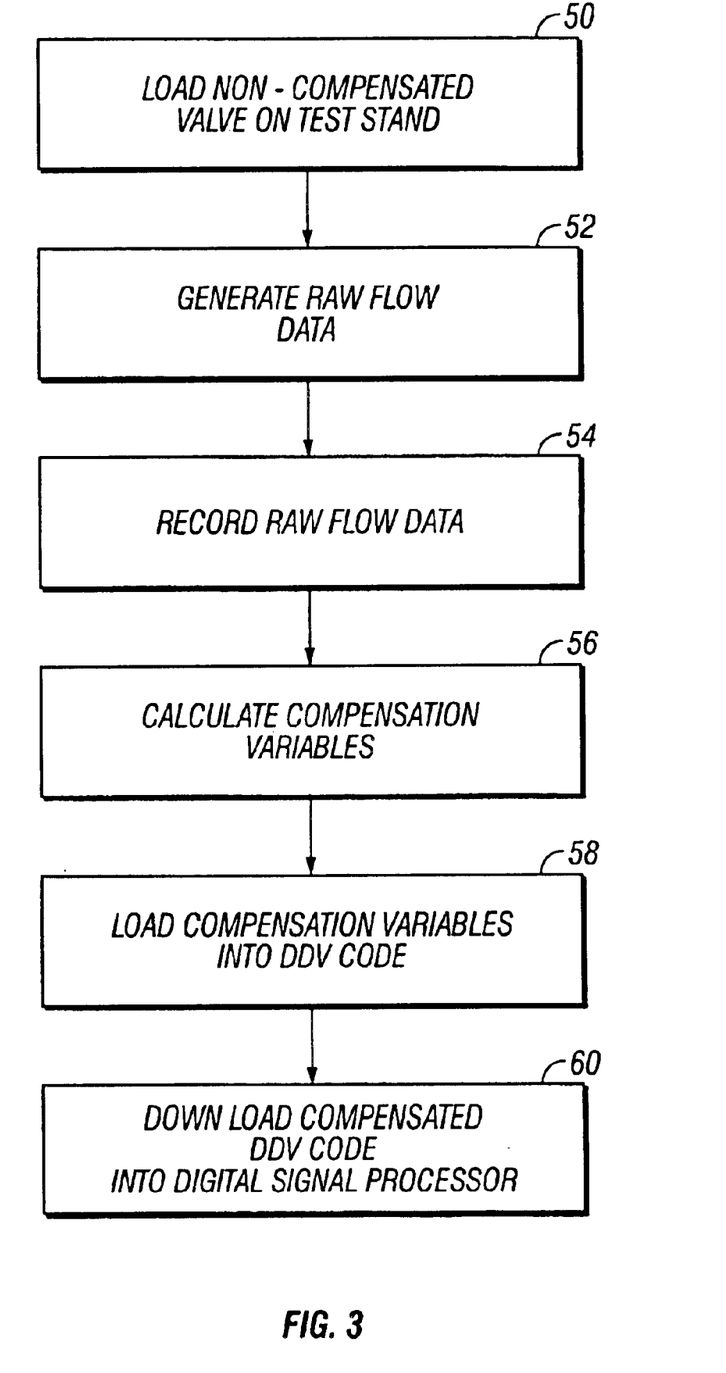
FIG. 3 is a flow chart and block form illustrative of the method of the present invention.

By referring now more particularly to FIG. 3 there is shown in flow chart form the various steps of the method for providing a predetermined fluid flow output from a direct drive valve in accordance with the principles of the present invention. As is therein shown at 50 the nonflow compensated valve is loaded on to an appropriate hydraulic test stand and is properly connected thereto to provide appropriate motor control signals to the drive motor of the direct drive valve as well as having the output flow therefrom connected to an appropriate flow transducer to generate the analog signals above referred to. Such is indicated at 52 in that raw flow data is generated after the valve 34 is connected to the test stand. The raw flow data is then recorded in the computer of the test stand as shown at 54. Thereafter the raw flow data is compared to the desired predetermined flow pattern to detect the differences between the raw flow data and the desired flow pattern. As a result of the differences, the computer utilizes an appropriate algorythm or formula to calculate compensation variables as shown at 56 in order to properly compensate the flow of the valve in order to achieve the desired predetermined flow pattern. These compensation variables as shown at 58 are then loaded into the DDV code which is utilized to drive the direct drive valve. Thereafter the compensated direct drive valve code is downloaded into the digital signal processor which is a part of the valve as is shown at 60.

Figure 4:
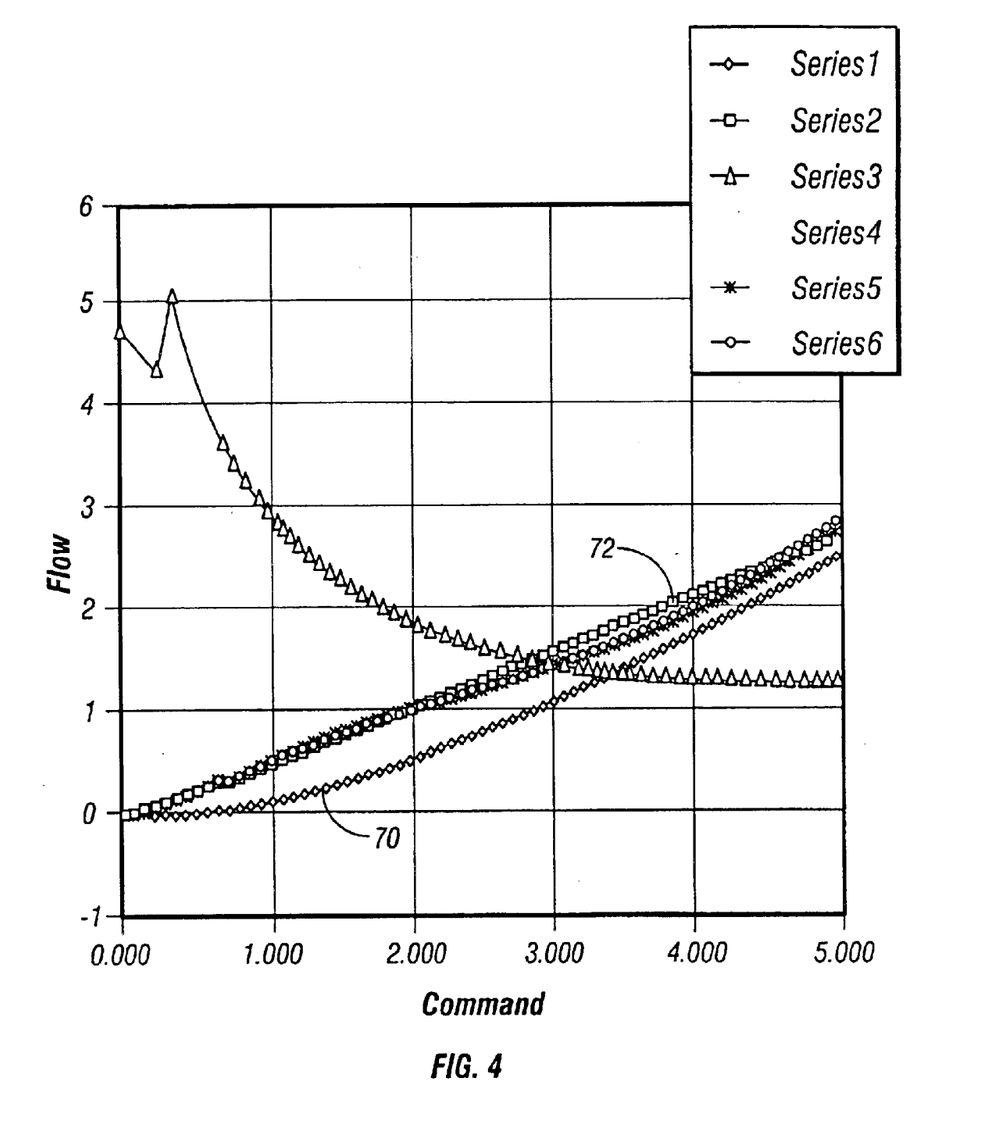
FIG. 4 is a graph showing curves used in carrying out the method and system of the present invention.

By reference now to FIG. 4 there is illustrated in graphical form the manner in which flow compensation is achieved when the desired flow output is a linear flow. It will be recognized by those skilled in the art that only one half of the current vs. flow curve for the valve is shown with input command current on the abscissa and flow on the ordinate. As is therein shown at 70 the raw flow data is obtained from the valve after it is loaded onto the test stand. As is shown in FIG. 4, the raw data flow curve is nonlinear. As is shown at 72 there is provided a desired predetermined flow for the valve for the particular application for which it is intended, in this instance a linear flow. The differences between the curves 70 and 72 are determined by comparing the same in the computer 30. There is then generated compensation variables as is shown by the curve 74 which may be inserted into the DDV code to cause the flow at each point along the raw flow data curve to be changed to reflect the desired linear flow as shown by the curve 72. This may be accomplished by generating a polynomial such as $y=-0.0295x^3+0.4322x^2-2,1198x+4.5837$. Through the utilization of this polynomial each point on the raw flow data curve may be inserted into the unknown (x) portion of the polynomial and then the polynomial is solved. When it is solved the compensation variable for that particular point on the raw flow data curve is changed to move the flow pattern to the desired flow as shown at 72 thus linearizing the output from the direct drive valve.

Figure 5:
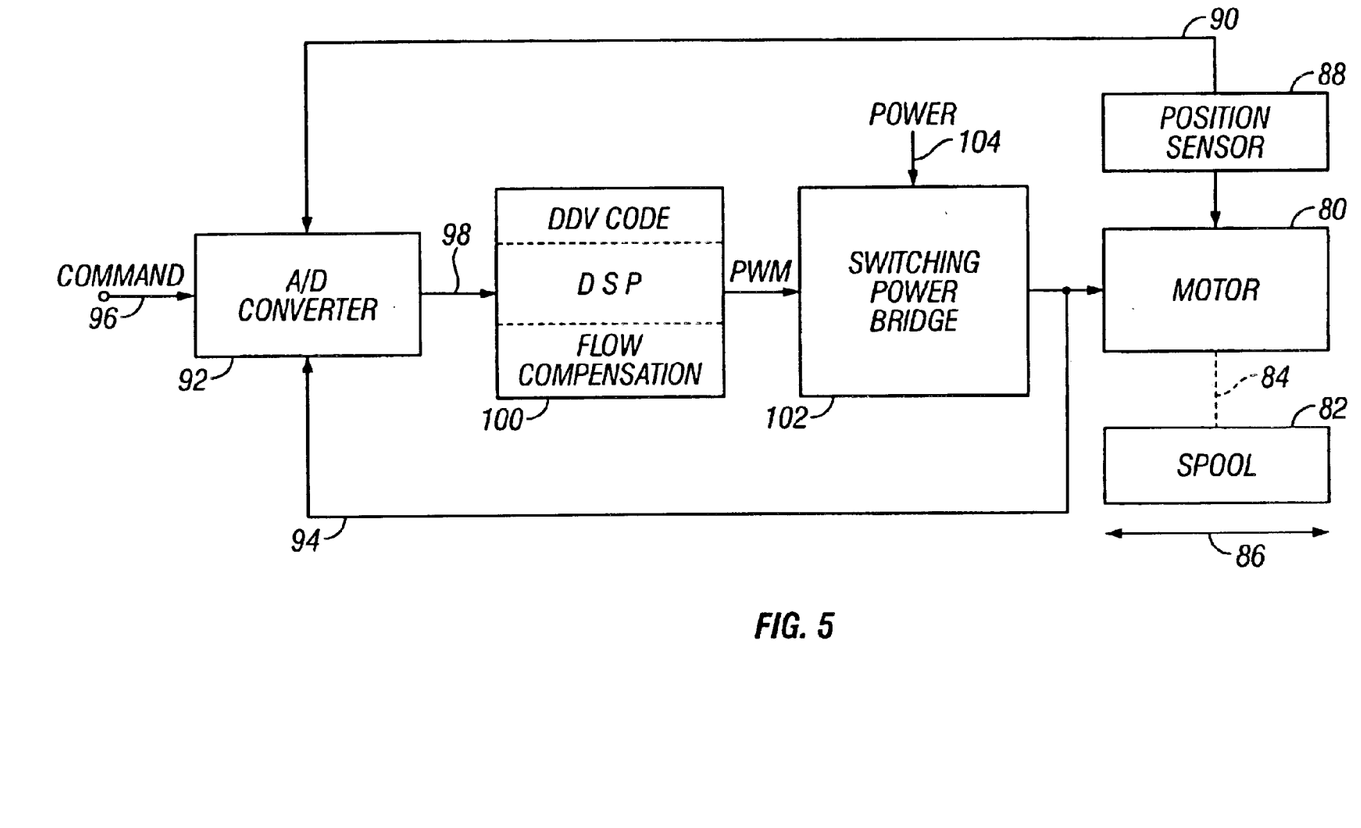
FIG. 5 is a simplified block diagram showing the motor control circuit in greater detail.

Referring now, more particularly to FIG. 5, there is illustrated in block diagram further detail regarding the manner in which flow compensation is accomplished in accordance with the principles of the present invention. As is therein shown, a motor 80 drives a spool 82 by way of the mechanical interconnection 84 therewith to cause the spool to reciprocate as illustrated by the arrow 86 which will in turn, cause hydraulic fluid under pressure to flow out of the valve to a load (not shown). As an integral part of the motor, there is provided a position sensor 88 which may, for example, be a Hall sensor which provides angular motor rotor position. The electrical signal generated by the position sensor 88 is fed back by way of the connection 90 to an analog to digital converter 92. Also fed back to the analog to digital converter by way of the connection 94 is motor current. Also applied to the analog to digital converter 92 is a command signal which is applied to the terminal 96 from a source thereof depending upon the particular application involved.

The analog to digital converter 92 internally compares the command signal, the feedback position signal and the current signal and combines them and converts the output into a digital signal which is applied by way of the connection 98 to the digital signal processor 100. As will be understood from the description provided above, the digital signal processor 100 will have loaded into it the DDV code. That is, this is the algorythm which is normally utilized to drive the motor 80 and to cause the spool 82 to reciprocate. In order to provide the desired predetermined flow pattern out of the valve, the flow compensation which has been determined by way of a polynomial or combination of polynomials is present in the digital signal processor 100 and is loaded into the DDV code. That is, when the command signal is applied, the digital signal processor will recognize that according to the DDV code the motor should move to a predetermined position. The flow compensation formula will then cause the DDV code to be changed to move the motor to the position required to effect the change in the output flow from the valve to that which is desired. The digital signal processor as a result of this operation upon the DDV code will then provide a series of PWM signals to a switching power bridge 102 which will apply the power from the source 104 thereof to the coil of the motor 80 to drive the motor to the desired position to provide the desired predetermined output flow pattern. For the particular application under consideration it should be recognized by those skilled in the art that although the various components shown in FIG. 5 are illustrated by way of separate blocks in the schematic block diagram that each of the components may be an integral part of the motor 80 and is contained within the housing thereof.

Figure 6:
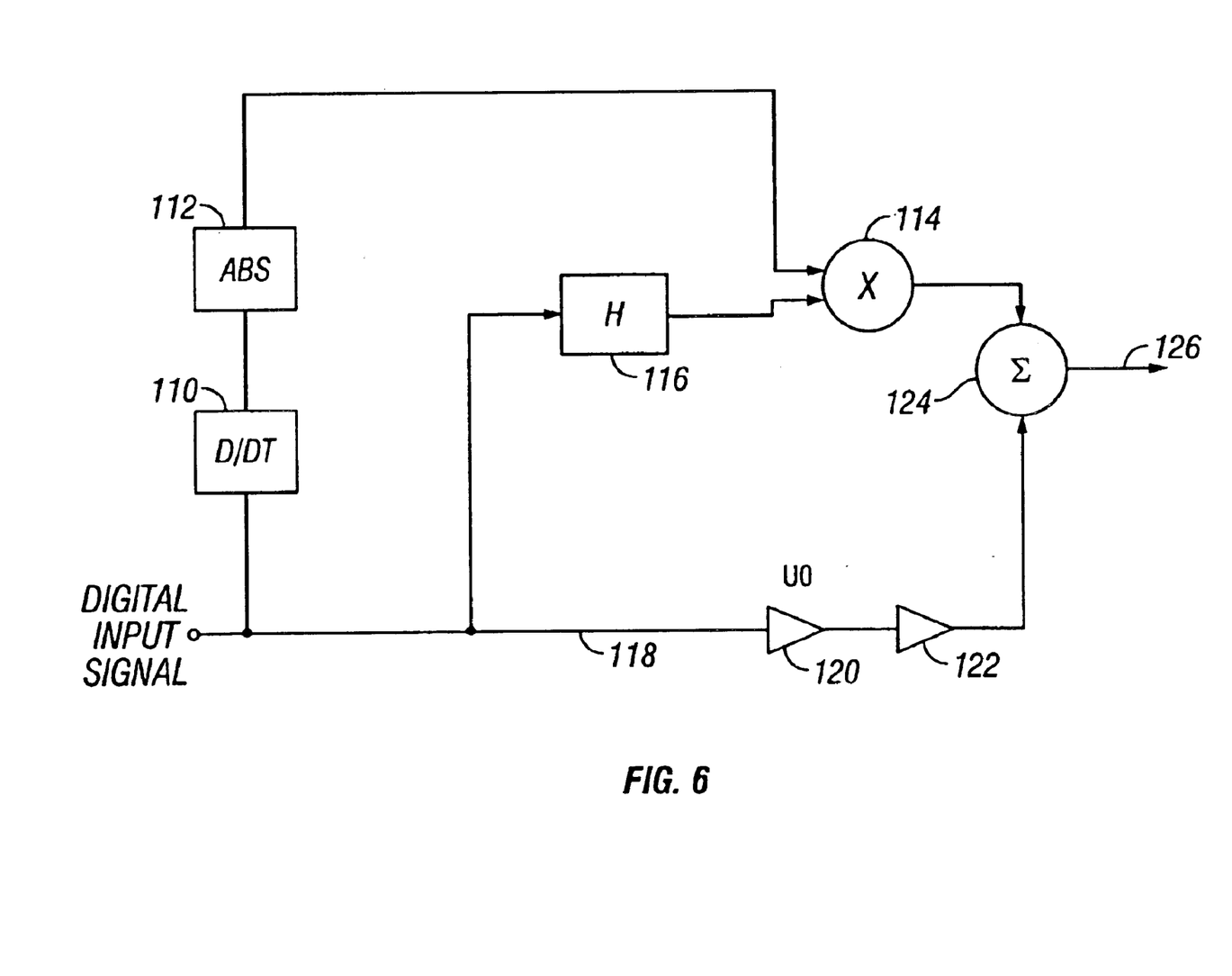
FIG. 6 is a simplified block diagram schematic of a scheme for further compensation to overcome errors which are generated by a fast rate of command input signals.

Under some circumstances the input command signals occur at a rate such that the normal compensation placed into the system to provide the desired output flow lag behind the command signals by such a degree that the valve does not function properly. As a result, in some instances, it is desirable to detect the amount of change in the command input signals and minimize or totally negate the compensation above referred to and allow the valve to operate only upon the DDV code that is loaded into the digital signal processor. Such a scheme is shown in FIG. 6 to which reference is hereby made. As is therein shown, the digital signal output of the A/D converter 92 (FIG. 5), which is the digital input command signal to the DSP 100, is applied to the block 110. The block 110 compares the output of the A/D converter 92 at successive periods of time, effectively taking the first derivative with respect to time of a characteristic of the command signal. Block 110 thus provides an output signal that is proportional to the rate of change of the digital input signal and therefore, the command signal. For purposes of the invention, it is only the magnitude of the change that is used and thus, the absolute value thereof is taken as shown at 112. This signal then is applied as one input to a multiplier 114. The normal compensation signal as shown at 116 as H is applied as the other input to the multiplier 114. The multiplier functions in such a manner that the compensation signal H would be totally nullified if the rate of change of the digital input signal, was sufficiently large. As a result, the digital input signal would be applied directly by the connection 118 and the amplifiers 120 and 122 to the summing network 124, the output 126 of which would be applied to the motor control circuit. In operation, the circuit as shown in FIG. 6 would function in such a manner that if the rate of change of the digital input signal was such that it would not cause an undue lag at the motor operation, that is, it is low or moderate, then the output at 126 would be the digital input signal with full compensation thereon. That is, the compensation would be generated by the formula $H(x)+U_o(x)$. The signal applied as a result of the first derivative with respect to time to the multiplier 114 would be zero or very low and the compensation H would be applied without substantial reduction to the summing network 124 along with the digital input signal to provide the compensated input signal for motor control.

Although a specific example of linearization of the flow from the direct drive valve is illustrated and discussed it is expressly to be understood that such is not to be considered a limitation upon the scope of the present invention. The flow from the valve may be compensated to provide any particular desired flow pattern from the valve as may be desired simply by compensating the command signals generated by the digital signal processor which then controls the direct drive valve.

What is claimed is:

1. A method for providing a predetermined fluid flow output from, a direct drive valve comprising the steps of:
   (A) generating raw flow data for said direct drive valve;
   (B) comparing said raw flow data to a desired predetermined flow for said direct drive valve;
   (C) calculating compensation variables analogous to the difference between said raw flow data and said desired predetermined flow;
   (D) providing a digital signal processor to control said direct drive valve; and
   (E) loading said compensation variables into said digital signal processor.

2. The method for providing a predetermined fluid flow output from a direct drive valve as defined in claim 1 wherein said step of generating raw flow data includes providing a hydraulic valve test stand, attaching said direct drive valve to said test stand, applying command signals generated by a direct drive valve algorythm to said direct drive valve, and measuring the flow from said valve in response to said command signals.

3. The method for providing a predetermined fluid flow output a direct drive valve as defined in claim 1 wherein said calculating step includes generating a formula for approximating a multiplier for predetermined raw flow data points which when applied to said predetermined raw flow data points will generate said predetermined flow.

4. The method for providing a predetermined fluid flow output from a direct drive valve as defined in claim 2 wherein said measuring of flow from said valve produces an electrical analog signal representative of said flow.

5. The method for providing a predetermined fluid flow output from a direct drive valve as defined in claim 4 which includes the further step of digitizing said analog signals.

6. The method for providing a predetermined fluid flow from a direct drive valve as defined in claim 5 wherein the step of calculating compensation variables includes solving a polynomial and entering the solution into the direct drive valve algorythm.

7. A system for providing compensation to command signals for a direct drive valve to cause the fluid flow output from said valve to conform to a predetermined flow comprising:

means for generating raw flow data from a direct drive valve not having flow compensation;

means for comparing said raw flow data to a desired predetermined flow for said valve to determine the difference there between;

means for calculating flow compensation variables analogous to the difference between said raw flow data and said desired predetermined flow;

a digital signal processor for generating command signals for application to said direct drive valve; and means for applying said compensation variables to said digital signal processor for causing said command signals to drive said valve to produce said desired predetermined flow.

8. A system as defined in claim 7 wherein said means for generating raw flow data includes a hydraulic valve test stand.

9. A system as defined in claim 8 wherein said test stand includes mews for applying command signals to said valve, transducer means for generating analog electrical signals representative of fluid flow from said valve, and means for digitizing said analog signals.

10. An integrated flow compensated directed drive valve comprising:

means for controlling the flow of fluid from a source thereof to a load;

means for driving said means for controlling;

a digital signal process or for providing control signals to said means for driving, said digital signal processor including flow compensation derived from raw flow data generated from said direct drive valve;

means for coupling a command signal to said digital signal processor;

means for determining the rate of said command signal; and means for reducing the effectiveness of said flow compensation as the rate of said command signal increases.

11. A direct drive valve as defined in claim 10 which further includes an analog to digital converter, means for detecting the position of said means for driving to produce an analog electrical signal representative of said position, means for coupling said signal to said analog to digital converter and means for coupling an output of said analog to digital converter to said digital signal processor.

12. A direct drive valve as defined in claim 11 which further includes means for coupling said control signal to said analog to digital converter.

* * * * *